United States Patent
Griffin et al.

(10) Patent No.: US 10,650,353 B2
(45) Date of Patent: May 12, 2020

(54) CONTEXT ORIENTED ASSESSMENT FOR TRAVEL COMPANIONSHIP

(71) Applicant: International Business Machines Corporation, Armonk, NY (US)

(72) Inventors: Thomas D. Griffin, Campbell, CA (US); Divyesh Jadav, San Jose, CA (US); Sunhwan Lee, Menlo Park, CA (US); Priscilla Fernanda Jimenez Pazmino, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 15/220,187

(22) Filed: Jul. 26, 2016

(65) Prior Publication Data
US 2018/0032963 A1    Feb. 1, 2018

(51) Int. Cl.
*G06Q 10/10* (2012.01)
*H04W 68/00* (2009.01)
(Continued)

(52) U.S. Cl.
CPC ......... *G06Q 10/1093* (2013.01); *G06N 5/006* (2013.01); *G06N 5/041* (2013.01);
(Continued)

(58) Field of Classification Search
None
See application file for complete search history.

(56) References Cited

U.S. PATENT DOCUMENTS

| 8,090,707 B1 | 1/2012 | Orttung et al. |
| 8,126,903 B2 | 2/2012 | Lehmann et al. |

(Continued)

FOREIGN PATENT DOCUMENTS

| CA | 2512465 A1 * | 2/2006 | ............ G06Q 30/02 |
| EP | 2336956 | 6/2011 | |
| WO | 01/67203 | 9/2001 | |

OTHER PUBLICATIONS

Paulo Figueiras et al, "Knowledge Base Approach for Developing a Mobile Personalized Travel Companion," 2013, International Conference on ITS Telecommunications (ITST), 13th, pp. 97-103 (Year: 2013).*

(Continued)

*Primary Examiner* — Amanda Gurski
(74) *Attorney, Agent, or Firm* — Lieberman & Brandsdorfer, LLC

(57) ABSTRACT

Embodiments relate to a system, computer product, and method for identifying a potential travel companion. A travel companion application is provided for installation on a remote subscriber computer. Upon entering travel data for a specified trip, a remote server accesses a memory databank of travel companion recommendations and compares the recommendations with the travel data in order to determine whether there exists matching travel data with a potential travel companion. In response to the matching identification, a formatted travel alert is communicated over a wireless communication channel to a destination address. The alert activates an application that both causes display of the alert on a remote device, and provides a URL with connection to the associated data source.

20 Claims, 9 Drawing Sheets

(51) Int. Cl.
  *G06N 20/00*   (2019.01)
  *G06N 5/04*   (2006.01)
  *G06N 5/00*   (2006.01)
  *G06Q 50/14*   (2012.01)

(52) U.S. Cl.
  CPC ............ *G06N 20/00* (2019.01); *H04W 68/00*
        (2013.01); *G06Q 50/14* (2013.01)

(56) References Cited

U.S. PATENT DOCUMENTS

| | | | |
|---|---|---|---|
| 8,700,539 B2 | 4/2014 | Strohmenger et al. | |
| 2006/0212319 A1* | 9/2006 | Strothmann | G06Q 10/02 |
| | | | 705/5 |
| 2009/0157613 A1* | 6/2009 | Strohmenger | G06Q 10/10 |
| 2011/0153629 A1* | 6/2011 | Lehmann | G06Q 10/06 |
| | | | 707/758 |
| 2013/0036139 A1* | 2/2013 | Kung | G06Q 10/025 |
| | | | 707/780 |
| 2014/0032259 A1 | 1/2014 | LaFever et al. | |
| 2014/0058769 A1 | 2/2014 | Zhang et al. | |
| 2015/0127628 A1* | 5/2015 | Rathod | H04W 4/21 |
| | | | 707/710 |
| 2017/0083832 A1* | 3/2017 | Williams | G06Q 10/02 |

OTHER PUBLICATIONS

Knoblock et al., Beyond the Elves: Making Intelligent Agents Intelligent, AI Magazine, vol. 29, No. 2, pp. 33-42, Summer 2008.

\* cited by examiner

| ID 510 | Repeated? 520 | # Invitees 530 | # unique area codes 540 | (# unique area codes) / (# invitees) 550 | Related with business travel? 560 |
|---|---|---|---|---|---|
| 1 | True | 7 | 1 | 0.143 | False |
| 2 | False | 6 | 4 | 0.667 | True |
| 3 | False | 1 | 1 | 1 | False |
| 4 | False | 9 | 4 | 0.444 | True |
| 5 | False | 2 | 2 | 1 | True |
| 6 | False | 7 | 3 | 0.429 | False |
| 7 | False | 12 | 1 | 0.083 | False |
| 8 | False | 1 | 1 | 1 | False |
| 9 | False | 1 | 1 | 1 | False |

CONTEXT ORIENTED ASSESSMENT FOR TRAVEL COMPANIONSHIP

BACKGROUND

The present embodiments relates to generation of context based data output. More specifically, the embodiments relates to generating a model associated with source data, and through introduction of an attribute to the model producing context based output in the form of a travel community.

People travel for many reasons. In general travel is categorized into business and leisure. Business travel general refers to travel and travel related activities that are directly or indirectly related to performing the duties of a job. One type of business travel may be when a business entity may require associated business travel to a central location to receive instruction. Another type of work related travel may include periodic visits to one or more location to provide a service or work with a team. Both of these examples of business related travel are temporary in nature, since they do not involve relocation.

When people travel for leisure, they may are frequently going on vacation with friends or family. In both scenarios, the traveler will have at least one companion, such as a spouse, sibling, parent, etc. As such, leisure travel frequently includes a travel companion. However, when people travel for business, they are generally travelling as individuals instead of a small group. A business traveler attending a meeting may be traveling alone but when they reach their destination they may be a part of a large group of meeting attendees. Accordingly, the travel components of business related travel frequently takes place without a travel companion.

Traveling with a companion is economically more efficient than traveling as an individual. For example, sharing a taxicab or similar ground transportation enables the costs to be distributed among the companions. At the same time, traveling with a companion provides company, and perhaps a further business development opportunity.

SUMMARY

The embodiments include a system, computer program product, and method for distributing travel companion recommendations over a network to a remote subscriber computer.

In one aspect, a computer system is provided. The computer system includes a processing unit operatively coupled to memory, a remote subscriber computer, and a tool in communication with the processing unit to distribute travel companion recommendations over a network to the remote subscriber computer. The processing unit provides a travel companion application to a subscriber for installation on the remote subscriber computer, receives travel companion recommendations sent from a data source over the Internet, and stores a set of remote subscriber's preferences. The remote subscriber's preferences include information format, destination address, specified travel companion values, and a transmission schedule. The processing unit is to filter the received travel companion recommendations by comparing the received travel companion recommendations to the specified travel value, generate a travel alert from the filtered recommendations, format the travel alert into data blocks, and transmit the formatted travel alert over a wireless communication channel to a wireless device associated with the subscribers based on the destination address and transmission schedule. The alert activates a travel companion application to cause the alert to display on the remote subscriber computer and to enable connection via the URL to the data source.

In another aspect, a computer program product for distributing travel companion recommendations over a network to a remote subscriber computer is provided. The computer program product has a computer readable storage device with program code embodied therewith, the program code executable by a processing unit to provide a travel companion application to a subscriber for installation on the remote subscriber computer and receive travel companion recommendations at a transmission server sent from a data source over the Internet. The transmission server has a microprocessor and memory for storing the remote subscriber's preferences for information format, destination address, specified travel values, and a transmission schedule. The microprocessor filters the received travel recommendations by comparing the received travel recommendations to the specified travel value, generates a travel alert from the filtered recommendations, formats the travel alert into data blocks, and transmits the formatted travel alert over a wireless communication channel to a wireless device associated with the subscribers based on the destination address and transmission schedule. The alert activates a travel companion application to cause the alert to display on the remote subscriber computer and to enable connection via the URL to the data source.

In yet another aspect, method of distributing travel companion recommendations over a network to a remote subscriber computer is provided. A travel companion application is provided to a subscriber for installation on the remote subscriber computer. Travel companion recommendations are received at a transmission server, sent from a data source over the Internet. The transmission server includes a microprocessor and memory. The memory stores the remote subscriber's preferences for information format, destination address, specified travel values, and a transmission schedule. The microprocessor filters the received travel companion recommendations by comparing the received travel companion recommendations to the specified travel value, generates a travel alert from the filtered recommendations, formats the travel alert into data blocks, and transmits the formatted travel alert over a wireless communication channel to a wireless device associated with the subscribers based on the destination address and transmission schedule; the alert activating a travel companion application to cause the alert to display on the remote subscriber computer and to enable connection via the URL to the data source.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

FIG. 5 depicts a block diagram illustrating an example of a meeting identification.

DETAILED DESCRIPTION

Figure 1:
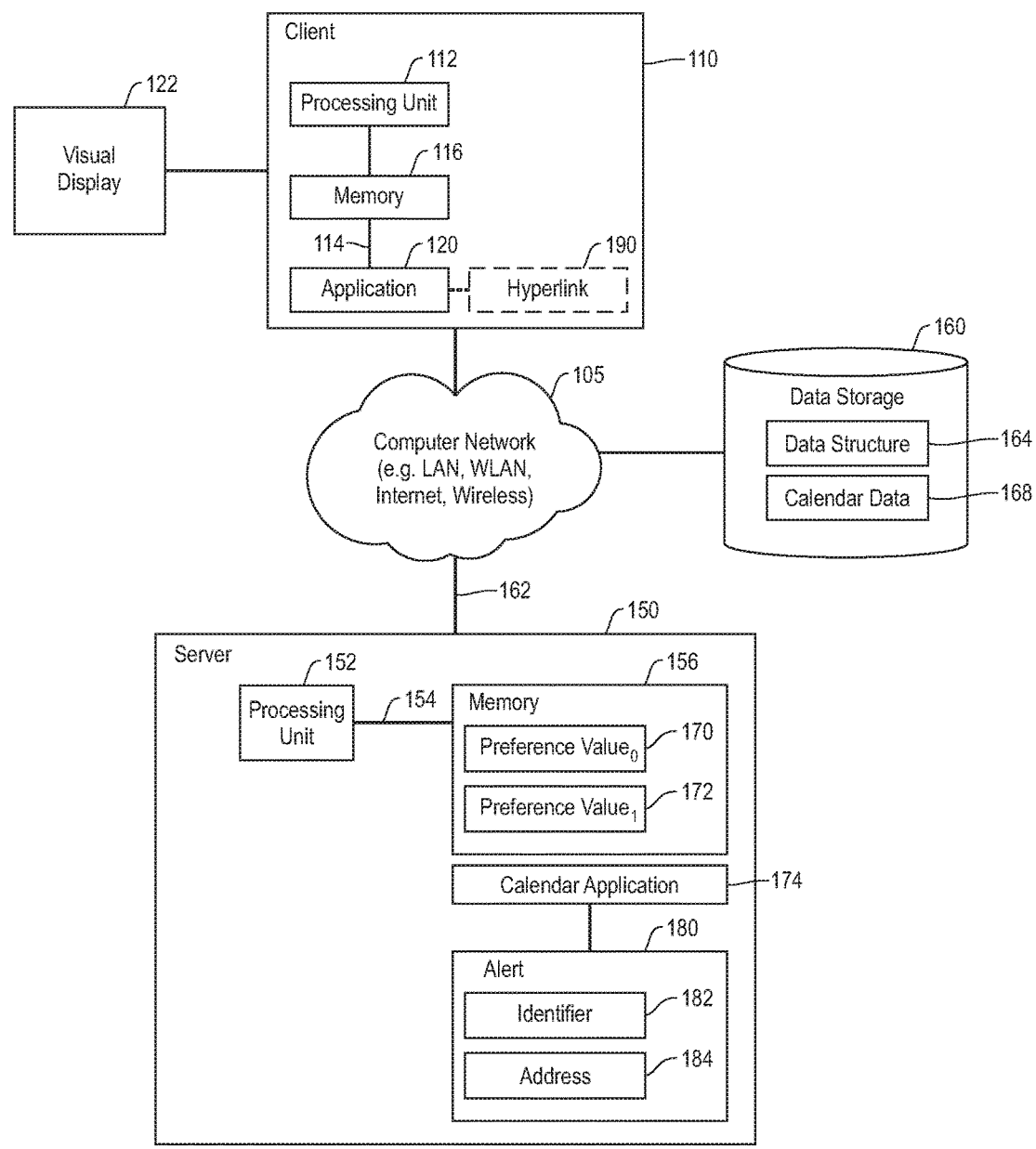
FIG. 1 depicts a block diagram illustrating a system and system components associated with travel companion identification.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A system and method are provided for dynamic and context-oriented travel companion recommendation based on multiple criteria. It is understood that travel may occur in different stages. For example, travel from a source to a destination may be de-composed into multiple travel components, such as travel from an office location to an airport, travel from a source airport to a destination airport, travel from the destination airport to a hotel, and travel from a hotel to the client site. This decomposition includes four components, although in on one embodiment there may be a different quantity of components from the decomposition. Travel from the client site for the return trip may include the same quantity or a different quantity of components. At the same time, there may be other sub-components associated with visiting the client site. Examples of other components may include travel for dining, travel between client sites, travel to a second destination, etc. There may be an opportunity to arrange or match a travel companion for one or more of the travel components. In one embodiment, a single travel companion may be identified for each of the identified travel components. Similarly, in one embodiment, two or more travel companions may be identified with different companions associated with different travel components.

It is recognized that business travel is frequently associated with one or more meetings. Each meeting may have a different selection of individuals invited to attend. In one embodiment, there may be an overlap of attendees of two or more meetings. It is understood that each meeting may have associated attributes that define the purpose and details of the meeting. Such attributes may include, but is not limited to, time, location, and attendees. For example, a meeting may be associated with a project, and the attendees may be directly related to members working on a specific project. A travel itinerary may identify to or more meetings, with each meeting associated with a different project, and each project having a different selection of professionals or associated related occupations. Accordingly, identification of a travel companion may grow in complexity based on the different attributes of the travel as defined by an associated itinerary.

Referring to FIG. 1, a system (100) is provided illustrating components associated with travel companion identification, and in one embodiment assignment. As shown, a client machine (110) is provided in communication with a server (150), also referred to herein as a transmission server, across a network connection (105). The client machine (110) is a computer connected to the network (105) with access to the server (150). More specifically, the client machine (110) employs the server (150) to support the functionality of travel companion identification and assignment. The client machine (110) may be in the form of a workstation, desktop, tablet, smartphone, etc. As shown, the client machine (110) is configured with a processing unit (112) in communication with memory (116) across a network connection (114). An application (120) is shown in communication with memory (116). The application (120) functions with support from the server (150) for identification and assignment of companionship for travel.

As shown, the server (150) is configured with a processing unit (152) in communication with memory (156) across a bus (154). The server (150) is provided with a local or remote connection (162) to a data source (160). Preference data values for the client (110) are shown stored local to the server (150). More specifically, the server (150) is configured to support multiple client machines with each machine have an associated set of preference data values. As shown in this example, at least two sets of preference values (170) and (172) are stored local to the server (150). The preference values (170) and (172) store data associated with information format, destination address, specified travel values, and a transmission schedule. In one embodiment, details of the preference values (170) and (172) are stored in the data source (160). For example, in one embodiment, a data structure (164) is maintained in the data source (160) with the data structure including an entry for each client machine. More specifically, the data structure stores associated data values and the preference values (170) and (172) including a link, address, or an equivalent connection directed to the data structure (164).

The server (150) is shown with a calendar application (174), and supporting calendar data (168). At the same time, the client machine (110) may interface with the calendar application (174) across the network connection, with the interface including calendar entries, removals, and or modification of entry details. The application (120) is configured to interface with the calendar application (174) in relation to recommendations for travel related companionship. In one embodiment, the calendar application (174) may take the form of a machine learning model, such as a Support Vector Machine, with contact information, such as a telephone number for each meeting attended, which may be used to classify the meeting and associated travel. The network connection (105) is configured to support bi-direction communication between the client (110) and the server (150). In one embodiment, the application (120) may be configured to receive a communication or alert (180) from the server (150) in response to an entry in the calendar or modification of an existing entry. The alert (180) may include a hyperlink (190) transmitted to the client machine (110), with selection of the hyperlink to direct the client machine (110) to an address of the data source (160), and/or the associated data structure (164) and/or calendar data (168) within the data source (160).

Application (120) may be in a hibernate or sleep mode, or a similar inactive state, until an action transforms the state of the application (120). For example, in one embodiment, an entry or amendment in the calendar may cause the state of the application (120) to become active on the client machine (110). Once in the active mode, the application (120) may interface with the calendar application (174) and the data source (160). For example, in one embodiment, the interface may produce a match, which is converted to an alert (180) that is communicated to the client machine (110) in the form of a hyperlink (190).

In another embodiment, the application (120) may be configured to review calendar entries associated with the client on a periodic basis to assess entries, with the frequency of the review be a configurable value. It is understood that a calendar may have different entry categories, in which one or more of those categories may entail travel. The configuration of the application (120) supports an interface with the calendar to search for designated meeting and characteristics that defines the meetings.

Figure 2:
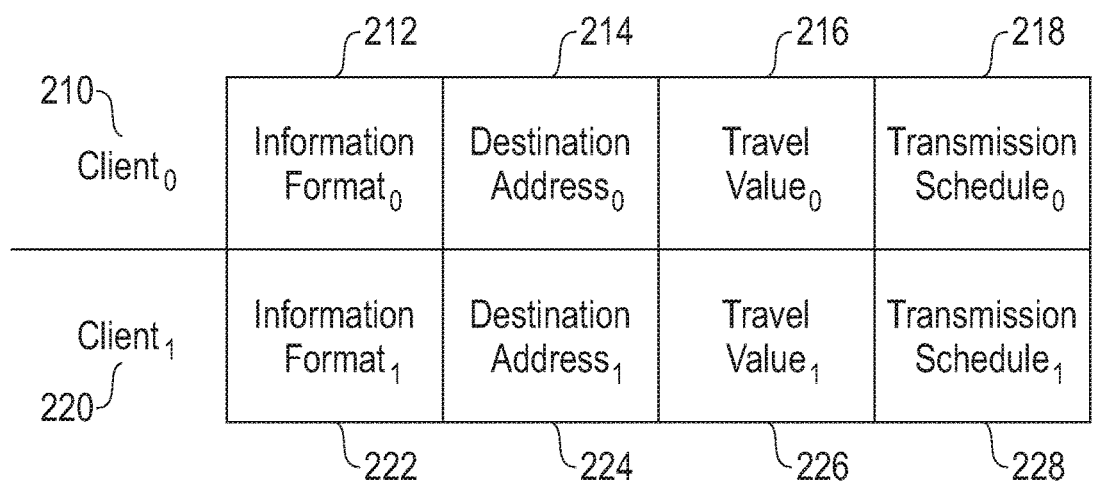
FIG. 2 depicts a block diagram illustrating an example of the data structure for two client machines.

FIG. 1 illustrates a system diagram with a client machine (110) in communication with the server (150) across a network connection (105). In one embodiment, the system of FIG. 1 may be expanded to support multiple client machines in communication with the server (150), through network connection (105). Referring to FIG. 2, a block diagram (200) is provided illustrating an example of the data structure for two client machines. The data structure stores values for each client machine. In this example, two client machines (210) and (220) and their associated data values are shown, although the quantity of machines should not be considered limiting. The data values, and more specifically, the data value categories, shown herein include, but are not limited to, information format, (212), (222), destination address (214) and (224), travel values (216), (226), and transmission schedule (218), (228). Information format (212), (222) relates to the manner in which travel information should be formatted for presentation to the designated client machine. Each client may have different formatting preferences based upon specific client needs and requirement. The destination address (214), (224) relates to the client machine address. Specifically, each client machine is in communication with the server across a network connection, and as such, each client machine includes an address unique to the client machine. For example, in one embodiment, the address (214), (224) may be in the form of an internet protocol address. The travel values (216), (226) include specific data values for the associated client as related to travel. The transmission schedule (218), (228) defines the frequency of communicating travel related data to the associated client machine. The transmission schedule may be on a periodic basis, or in response to an event.

Based on the configuration and interface between the client machine application (120) and the server, the processing unit (152) actively filters data and generates travel companion related recommendations. The values maintained in the data structure (200) define the protocols of the filtering. The filtering by the processor (152) takes place in the form of a comparison of one or more travel companion recommendations to one or more travel specified values. Based on the outcome of the comparison, an alert (180) may be generated by the processor (152). As shown, the alert (180) contains an identifier (182) and an address (184), which specifies a location of the data source (160). In one embodiment, the alert (180) is formatted into hyperlink (190). The processor transmits the formatted alert (180) over an associated communication platform (105) to a specified device. For example, in one embodiment, the alert (180) is transmitted to a specified address based on a transmission schedule, or in one embodiment, on-demand based on an event. The specified address may be a wireless communication device or a tablet platform, either of which is configured with the application (120). Receipt of the alert (180) on the designated receiving device causes the alert to be visually presented on an associated visual display (122), with the alert including a URL to connect the application (120) with the data source (160) so that the travel related information may be accessed by the application (120). Accordingly, the application changes states of operation based on receipt of the alert.

Figure 3:
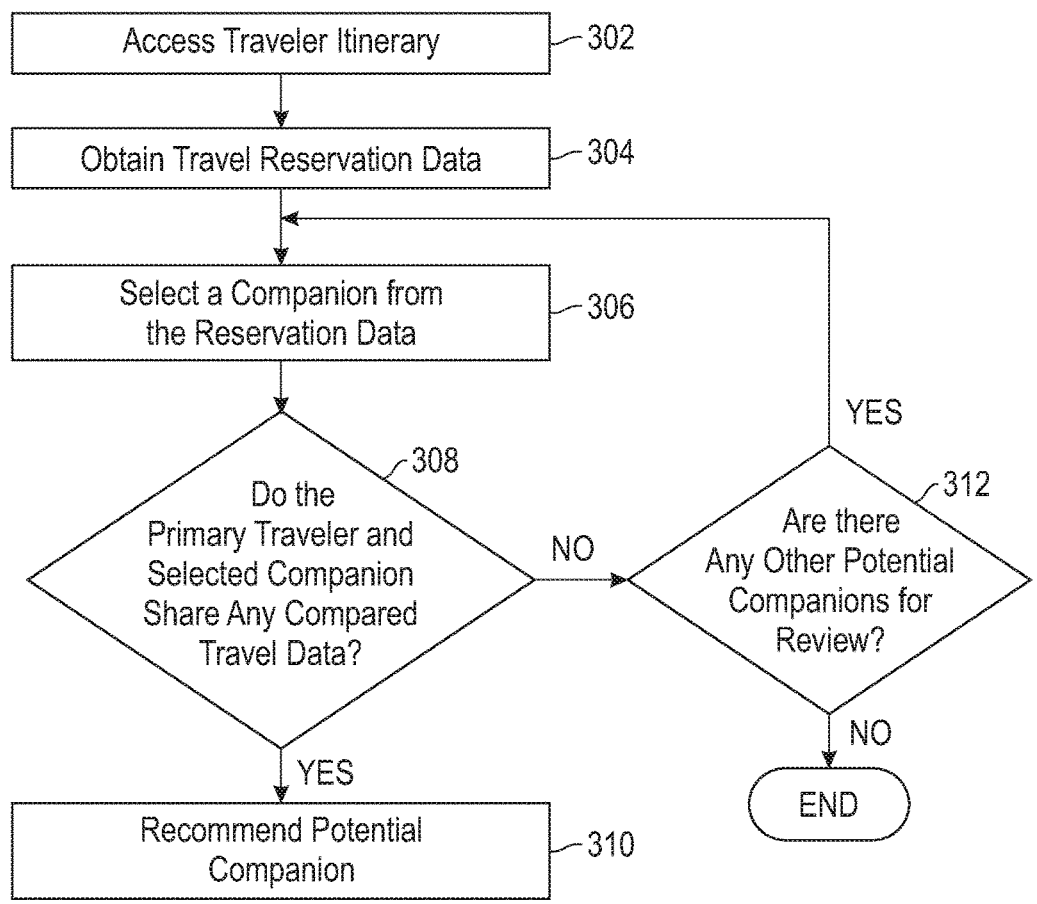
FIG. 3 depicts a flow chart illustrating a process for identification of travel participants and possible travel companions.

Referring to FIG. 3, a flow chart (300) is provided illustrating a process for identification of travel participants and possible travel companions. As shown, a traveler has an itinerary that is accessed (302). The itinerary includes details of a travel plan. The details may include travel reservation data, such as flight information, hotel information, meeting details, such as time and location, etc. Other details may include a corporate profile for the traveler, and access to associated customer relation management data. Based on the itinerary access at step (302), travel reservation data is obtained (304). In a corporate structure, a travel associate may be responsible for booking travel accommodations for each traveler. The travel reservation data obtained at step (304) may include a link or access to other travelers associated with the same corporate structure. In one embodiment, the link or listing at step (304) provides limited access to traveler companion data. It is understood that a corporate entity may require attendance of multiple attendees for a designated meeting. At the same time, multiple meetings may not include each traveler as an attendee. Accordingly, the travel reservation data at step (304) enables limited access to travel information for multiple travelers in the corporate entity or structure.

Based on presence of a link to a potential travel companion at step (304), the traveler accessing the data, referred to herein as a primary traveler, may select one or more of the potential companions (306). In one embodiment, each available link has an associated universal resource locator (URL) which specifies the location of the data source for the potential travel companion. As described in FIG. 1, the link is communicated to a client machine. Similarly, in one embodiment, selection of a link at step (306) activates a travel companion view application, e.g. from a hibernate or sleep mode. The application provides a platform for displaying travel companion data. Based on the platform, it is determined if the primary traveler and the potential companion share any compared travel data (308). In one embodiment, the compared travel data is limited, and includes flight information, hotel information, and airport information. The flight information may be limited to flight number(s) and determining if there is a match. The hotel information may include determining if there is a match of the hotel between the primary traveler and the potential companion. In one embodiment, the hotel match may be determined for a portion of the duration or the entire duration. The airport information may include a determination if there is an overlap of the airports for the travelers.

If any of the criteria at step (308) produces a match between the primary traveler and the potential companion, the potential companion is identified as a recommended companion (310). Similarly, if none of the criteria at step (308) produces a match, it is determined if there are any other links of potential travel companions available for review (312). A positive response at step (312) is followed by a return to step (306) for selection of a non-accessed link identifying a potential travel companion, and a negative response at step (312) concludes the process of identification of potential travel companions.

It is understood that the identification criteria at step (308) may be modified or expanded to assess potential companionship. Similarly, in one embodiment, an interface provides a field for each of the criteria with an assigned weight to the field. More specifically, the criteria being assessed may have an associated weight so that one criterion may have a more significant impact on determining a match. In one embodiment, the interface supports receipt of modification to the weights, thereby enabling the primary traveler to focus on those aspects that are important for identification of the potential travel companion. For example, in one embodiment, the hotel overlap may be of greater importance than being on the same flight. Following step (312), a listing of the potential travel companions is presented or is otherwise available. If there is more than one potential companion, the listing may be presented with an order having prioritization based on the associated weights. Accordingly, the identification process includes implicit or explicit feedback from the primary traveler to identify a potential match based on itinerary data.

Figure 4:
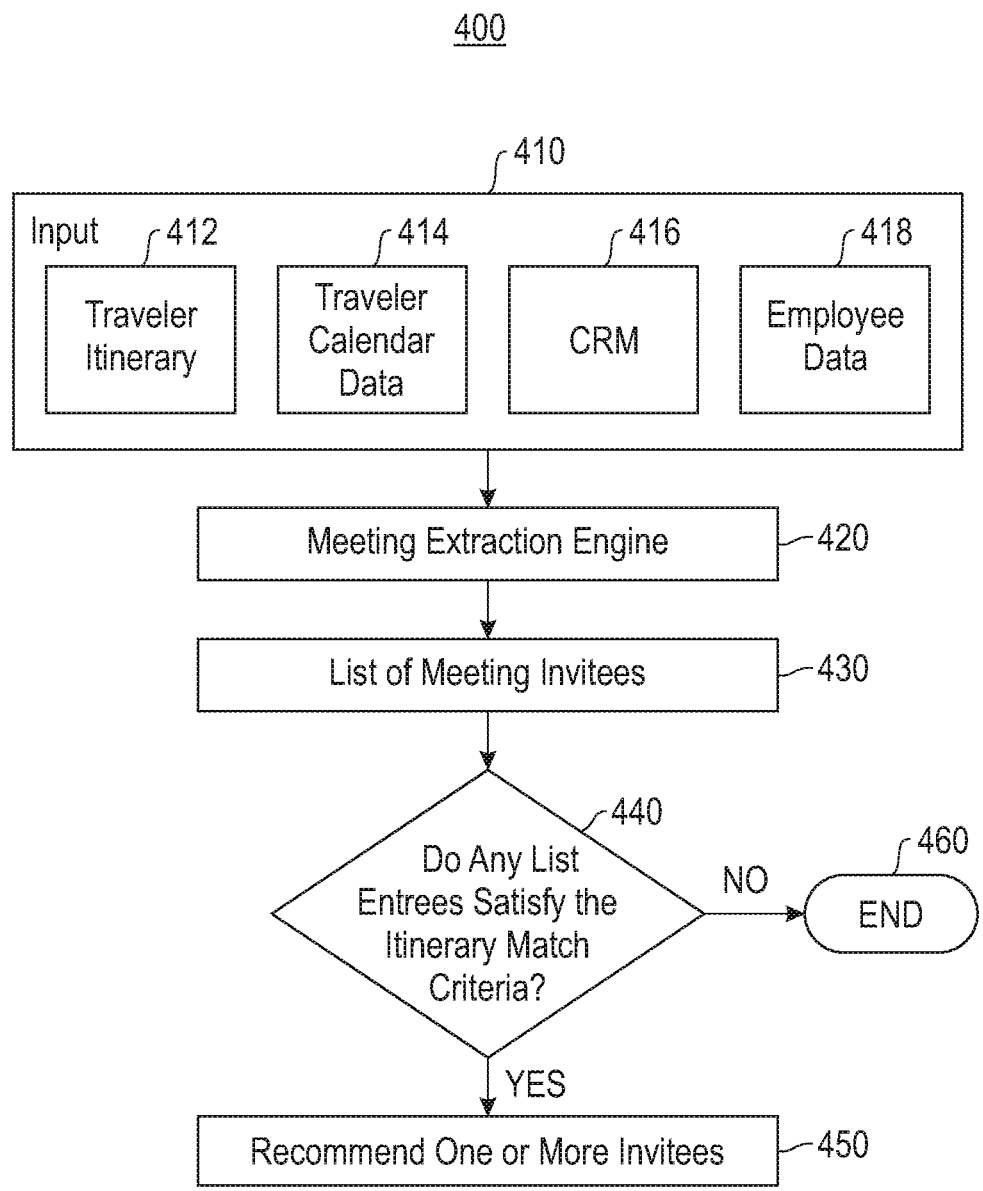
FIG. 4 depicts a flow chart illustrating a process for extrapolating the identification of FIG. 1 to a work related environment.

The process shown and described in FIG. 1 relates to identifying a potential traveling companion based on matching itinerary data. Referring to FIG. 4, a flow chart (400) is provided illustrating extrapolating the identification of FIG. 1 to a work related environment. As shown, there are a variety of data input (410) that are employed in the assessment. The data shown herein include traveler itinerary (412), traveler calendar data (414), customer relationship management data (416), and occupation data (418). In one embodiment, additional or alternative data may be employed in the input at step (410). Data input (410) represents both the traveler data and corporate entity associated data, and as such is differentiated from leisure travel. The data is received by an extraction engine (420) to identify meetings related to the travel itinerary. In one embodiment, a corporate entity maintains a global calendar of meetings, and a listing of corporate or organization members assigned to each of the meetings. It is understood that meeting data entered in the calendar may be incomplete, and in one embodiment may not include location data for one or more identified meetings. In one embodiment, the meeting data will include a minimum amount of data describing the meeting, including identifying that the entry is a meeting, and characteristics of the meeting, such as meeting location. Accordingly, the extraction engine (420) identifies business related meetings that align with the traveler itinerary.

The extraction engine (420) utilizes the input (410) and the associated input categories (412)-(418) to identify a list of meeting invitees (430). It is then determined if any of the invitees identified at (430) satisfy the itinerary match criteria (440). See FIG. 5 described below for further details on the determination at step (440). A positive response to the determination at step (440) is followed by recommending one or more invitees as potential travel companions for all or a portion of the associated travel (450). If at step (440), the response to the determination is negative, the recommendation process concludes (460). Accordingly, as shown herein one or more categories in input data may be used as criteria to identify potential travel companions.

Referring to FIG. 5, a block diagram is provided illustrating an example of a meeting identification. In this example, the diagram is in the form of a chart, although in one embodiment, the data may be organized in an alternative platform. As shown, each meeting is provided with a meeting identifier (510), which in one embodiment, is in numerical or alphanumeric form to different each meeting on the calendar. A meeting may be unique and have a single occurrence, or the meeting may be a meeting that repeats on a set frequency, such as an annual, quarterly, monthly, or weekly basis. For each meeting, the repetition of the meeting is identified (520). At the same time, each meeting includes a minimum of two attendees. A field (530) includes an entry for the number of attendees who have confirmed attendance at the associated meeting.

As shown in FIG. 4, each attendee has associated employment or occupation information that may be accessible from corporate records or a customer relationship management tool. In general, the information includes member contact information, including an electronic mail address and a telephone number, either office and/or mobile. Each telephone number has a prefix indicating the area code of the associated telephone (540). In one embodiment, the area code is an identifying characteristic of the locale of the member since the area code is directly associated with the source of where the telephone is registered. An assessment is conducted based on the number of registered attendees and the ratio of unique area codes for their associated contact telephone number, and the ratio is reflected in field (550). Each meeting has an associated classification identifying if the meeting is associated with business related travel (560). In one embodiment, the ratio at (540) is a strong indicator of the meeting classification. For example, if each attendee of the meeting has contact information with the same area code, the meeting is most likely local and does not have associated business travel. Similarly, if a significant quantity of meeting attendees have contact information with different area code, this is a characteristic that lends to the likelihood that attendees are traveling to attend the meeting. Accordingly, the model shown herein classifies a meeting based on attendee characteristics.

Business meetings may be internal, limited to members of a corporate entity, or external, available to both members and non-members of the corporate entity. Both classes of members may be assessed as potential travel companions. In one embodiment, the meeting may accessible via a URL, and linked to a meeting web site, which in one embodiment may include a list of attendees. Each attendee in the list has associated attendee information and characterizing data. For example, in one embodiment, each attendee may be presented with link that when activated opens a window with attendee data, such as place of employment or occupation, electronic mail address, telephone number, etc. At the same time, it is understood that although some meetings may not have all of their identifying information in the calendar, characteristics of the meetings may be ascertainable. For example, if the meeting is repeated on a periodic basis, annual, quarterly, monthly, etc., meeting characteristics may be obtained from a related calendar entry. Accordingly, meetings identified in the calendar have associated meeting characteristic data.

Figure 6:
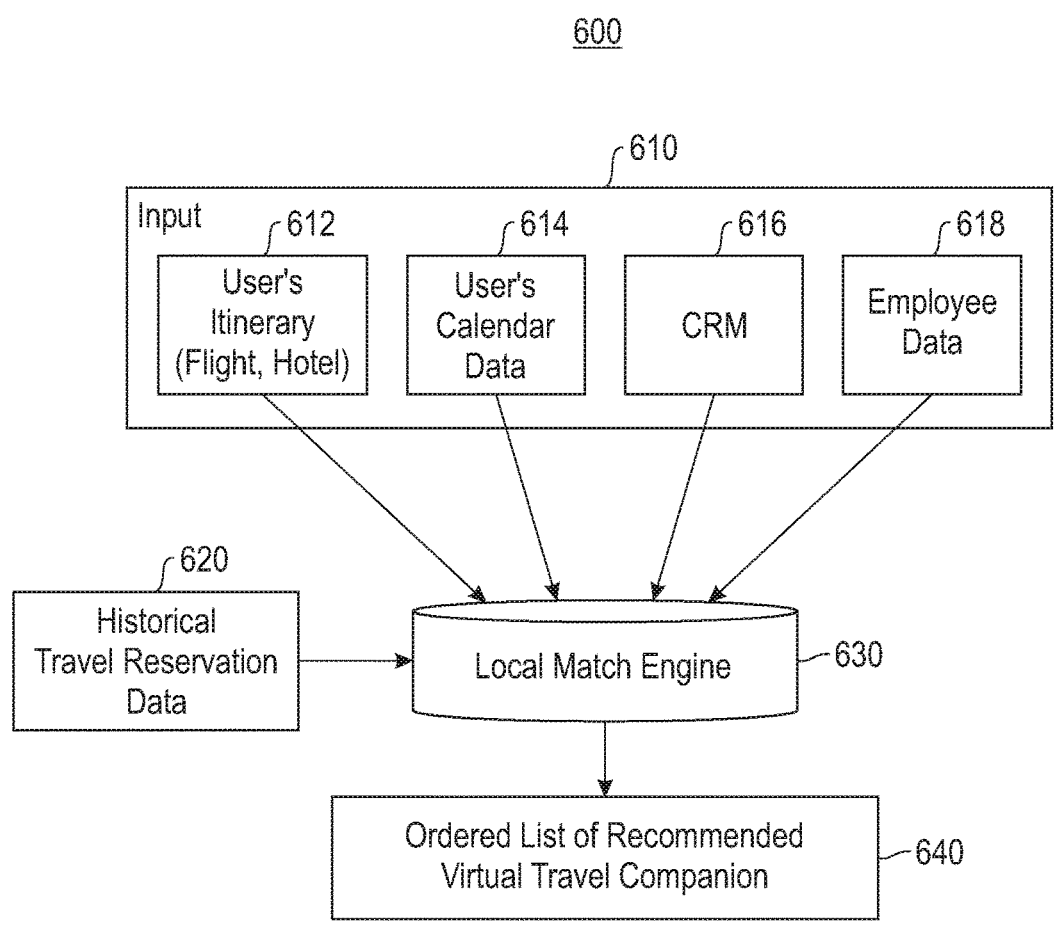
FIG. 6 depicts a flow chart illustrating a process for identifying one or more potential business travel companions.

Travel companions may be preferred for a variety of reasons, including companionship, economic efficiency, language or cultural assistance, etc. Referring to FIG. 6, a flow chart (600) is provided illustrating a process for identifying one or more potential business travel companions. Similar to the process shown in FIG. 3, a variety of data input (610) that are employed in the assessment. The data shown herein include traveler itinerary (612), traveler calendar data (614), customer relationship management data (616), and member data (618). In addition, historical travel reservation data (620) is utilized. The historical data (620) may include, but is not limited to, previous trip to the same destination, fluency of language of destination country, previous engagement with the same client or meeting participants, previous experience on the same flight, previous experience at the same hotel, etc. The data from (610) and the historical data (620) are input into a match engine (630), which outputs a list of potential virtual travel companions (640), such as a person who does not physically travel to the destination but has a vested or ancillary relationship relating the destination. For example, the virtual companion may be a team mate who has been at the destination on a prior occasion, or a team mate who participated in a prior client meeting. In one embodiment, the list (640) may include more than one potential companion, and as such, the list presents the potential companions with a structured order. For example, the list may separate the travel into multiple components, and list the potential companions based on the components, and further prioritize the list based on potential companions that are included in more than one component. In one embodiment, the list may be placed in an order based on an organization of the corporate entity, context of the business related travel, and network connections for the primary traveler.

The match engine (630) employs criteria to output a list of potential travel companions. More specifically, in this embodiment, the list of (640) is extended from the output of FIG. 4 to assess potential travel companions that have a value added component. For example, if there is a potential language barrier, the match engine may seek a companion who is bi-lingual. Similarly, since the travel is business related, the match engine (630) may seek a potential companion who has already developed a relationship with the primary traveler as evidence by a prior meeting or a working relationship, as evidenced in the customer relationship management data (616). In one embodiment, the match engine (630) may focus on prior travel to the same destination, including the travel route and hotel, as evidence from the historical data (620). Accordingly, the match engine (630) adds value to the potential travel companion that induces further business relationship development.

Aspects of the tools and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) of a cloud based support system, to implement the processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems or devices, and the like.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
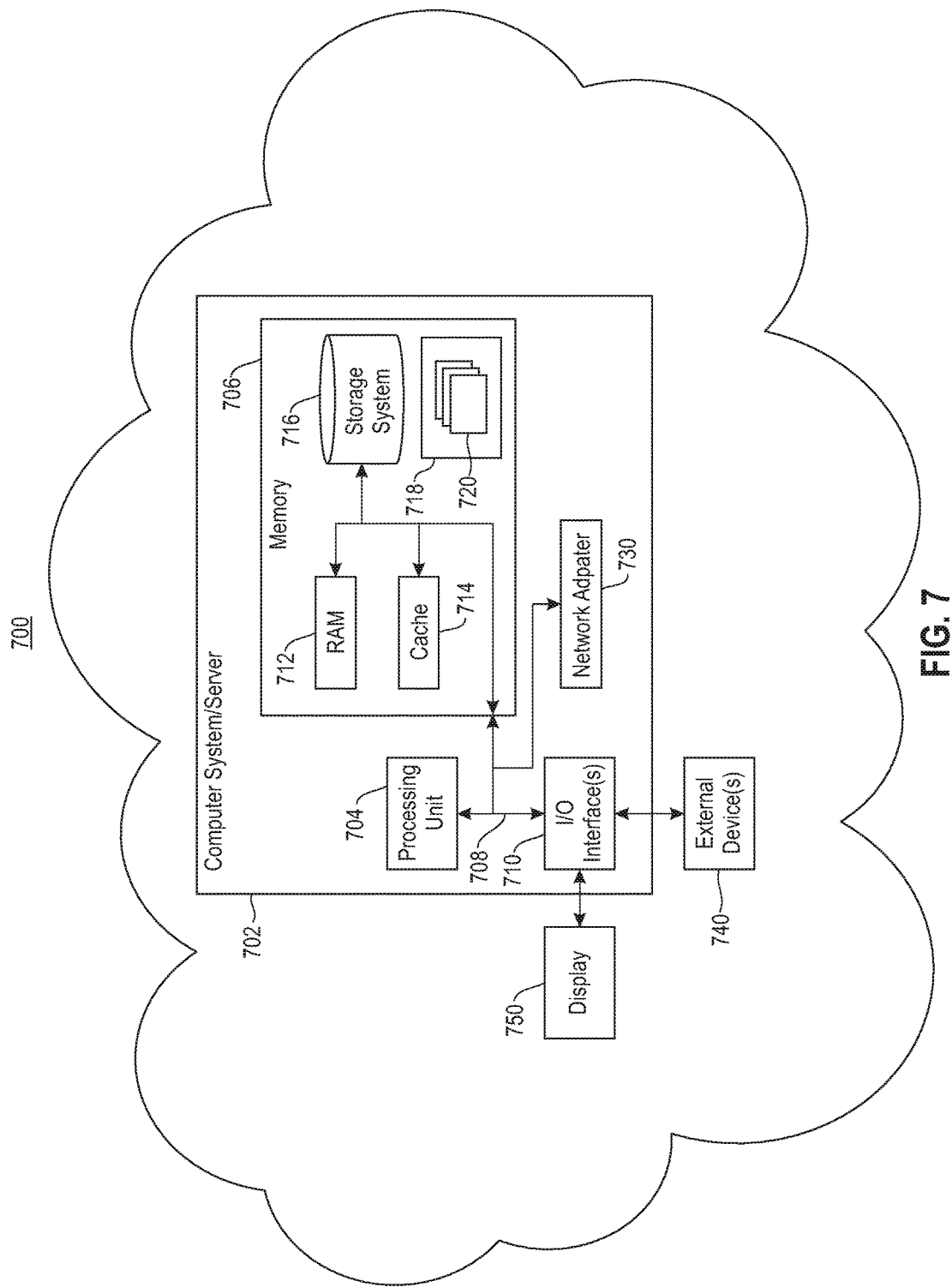
FIG. 7 depicts a schematic example of a system to implement the process shown and described in FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (712) and/or cache memory (714). By way of example only, storage system (716) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (718), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of embodiments of dynamic apportioning of accounts as described herein. For example, the set of program modules (720) may include the modules configured to implement the identification and analysis described above with reference to FIGS. 1-6.

Host (702) may also communicate with one or more external devices (740), such as a keyboard, a pointing device, etc.; a display (750); one or more devices that enable a user to interact with host (702); and/or any devices (e.g., network card, modem, etc.) that enable host (702) to communicate with one or more other computing devices. Such communication can occur via Input/Output (I/O) interface(s) (710). Still yet, host (702) can communicate with one or more networks such as a local area network (LAN), a general wide area network (WAN), and/or a public network (e.g., the Internet) via network adapter (730). As depicted, network adapter (730) communicates with the other components of host (702) via bus (708). In one embodiment, a plurality of nodes of a distributed file system (not shown) is in communication with the host (702) via the I/O interface (710) or via the network adapter (730). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (712), cache (714), and storage system (716), such as a removable storage drive and a hard disk installed in a hard disk drive.

Computer programs (also called computer control logic) are stored in memory (706). Computer programs may also be received via a communication interface, such as network adapter (730). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
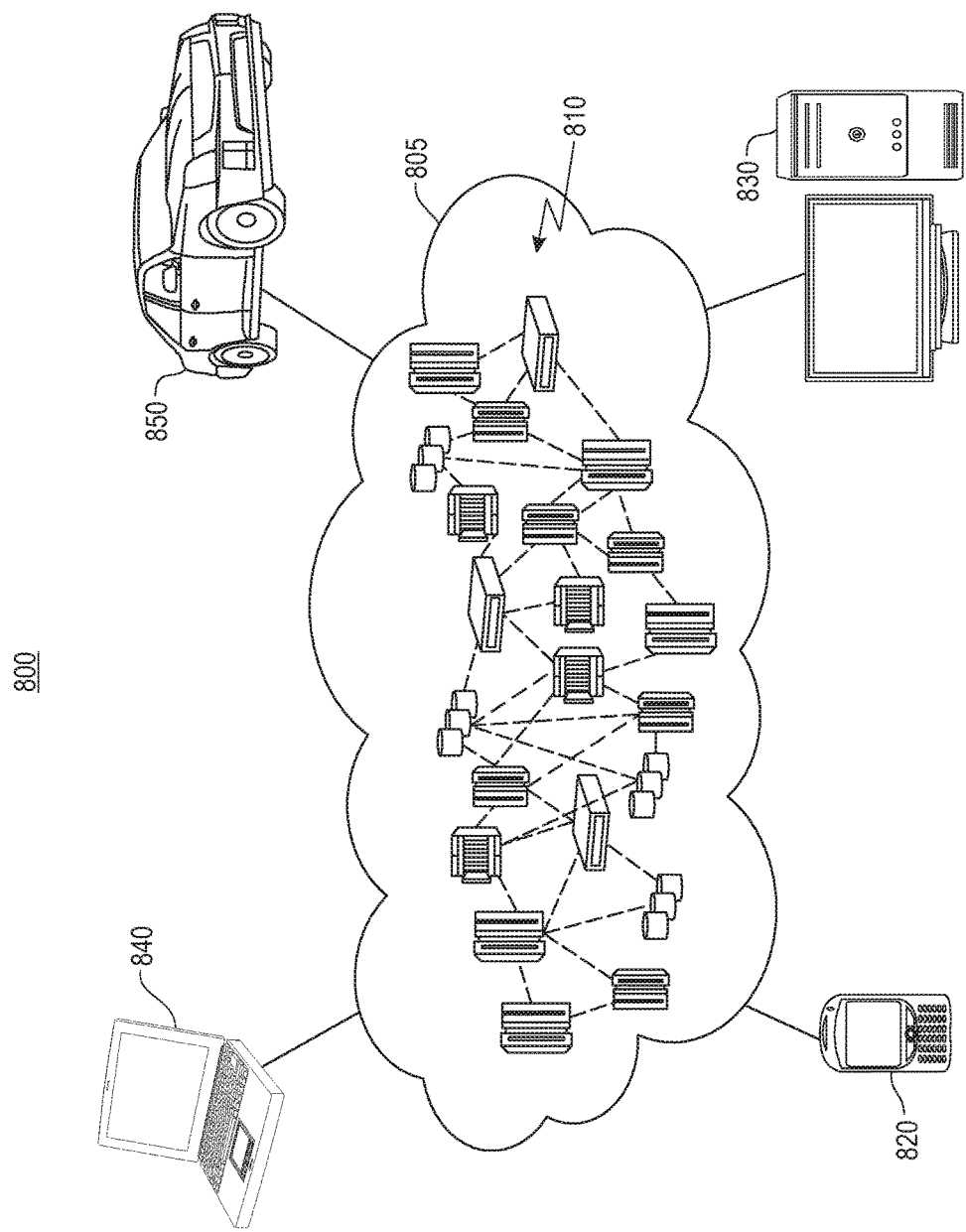
FIG. 8 depicts a block diagram illustrating a cloud computing environment.

Referring now to FIG. 8, an illustrative cloud computing network (800). As shown, cloud computing network (800) includes a cloud computing environment (805) having one or more cloud computing nodes (810) with which local computing devices used by cloud consumers may communicate. Examples of these local computing devices include, but are not limited to, personal digital assistant (PDA) or cellular telephone (820), desktop computer (830), laptop computer (840), and/or automobile computer system (850). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (820)-(850) shown in FIG. 8 are intended to be illustrative only and that the cloud computing environment (805) can communicate with any type of computerized device over any type of network and/or network addressable connection (e.g., using a web browser).

Figure 9:
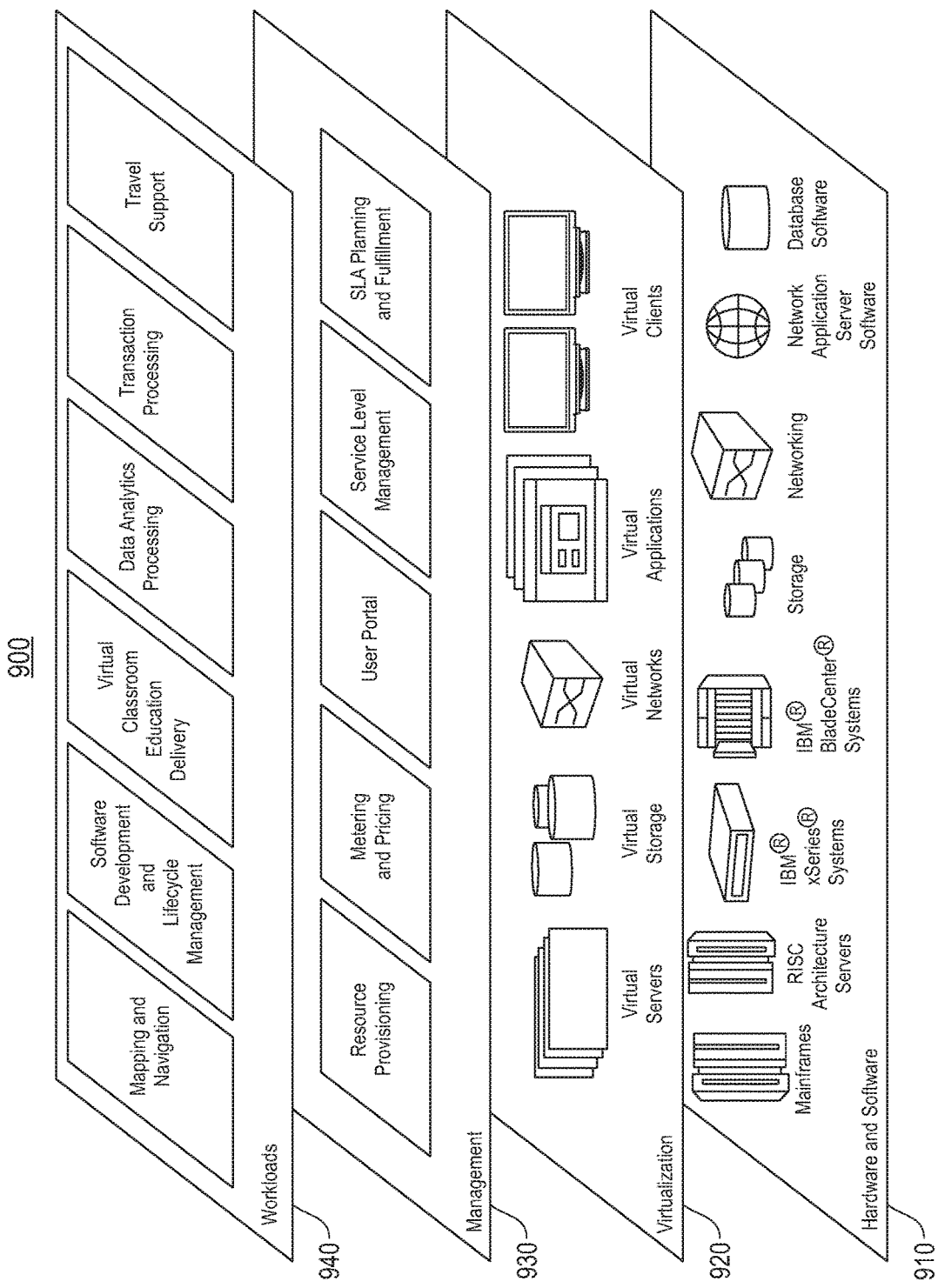
FIG. 9 depicts a block diagram illustrating a set of functional abstraction model layers provided by the cloud computing environment.

Referring now to FIG. 9, a set of functional abstraction layers provided by the cloud computing network of FIG. 7 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic travel companion support within the cloud computing environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments with various modifications as are suited to the particular use contemplated. Accordingly, the distribution of travel companion recommendations over a network to a remote subscriber computer whereby an alert activates a travel companion application, which causes the alert to display on the remote subscriber computer, and enables connection via the URL to the data source with the data of a potential travel companion.

It will be appreciated that, although specific embodiments have been described herein for purposes of illustration, various modifications may be made without departing from the spirit and scope of the embodiments. In particular, the embodiments may be adapted for other forms of travel including, but not limited to, leisure travel, family travel, special events travel, academic travel, etc. Accordingly, the scope of protection of these embodiments is limited only by the following claims and their equivalents.

What is claimed is:

1. A computer system comprising:
   a processing unit operatively coupled to memory;
   a remote subscriber computer; and
   a tool in communication with the processing unit to distribute travel companion recommendations over a network to the remote subscriber computer, including:
      providing a travel companion application to a subscriber for installation on the remote subscriber computer;
      receiving travel companion and virtual travel companion recommendations sent from a data source over the Internet, wherein the recommendations are based on customer relationship management data indicating a pre-existing relationship with the travel companion; and
      storing a set of remote subscriber's preferences comprising: information format, destination address, specified travel values, and a transmission schedule; and further comprising the processing unit to:

filter the received travel companion and virtual travel companion recommendations by comparing the received travel companion and virtual travel companion recommendations to the specified travel value;
generate a travel alert from the filtered recommendations, the alert containing a travel companion recommendation identifier, a virtual travel companion recommendation identifier, and an address which specifies the location of the data source;
format the travel alert into data blocks; and
transmit the formatted travel alert over a wireless communication channel to a wireless device associated with the subscribers based on the destination address and transmission schedule;
wherein the alert activates a travel companion application to cause the alert to display on the remote subscriber computer and to enable connection via a universal resource locator (URL) to the data source.

2. The system of claim 1, wherein the data source comprises travel data of one or more potential companions maintained within a data structure including a link to the travel data within the data structure.

3. The system of claim 2, further comprising the processing unit to: determine a match between the remote subscriber and a potential companion; and identify the potential companion to the remote subscriber, wherein the match is for at least a partial duration of scheduled travel.

4. The system of claim 1, wherein each specified travel value has an associated weight, the weight used to prioritize a specified travel value over another specified travel value.

5. The system of claim 1, wherein activation of the travel companion application further comprises the travel companion application to switch from an inactive state to an active state in response to detection of a new entry in an operatively coupled calendar application.

6. A computer program product for distributing travel companion recommendations over a network to a remote subscriber computer, the computer program product comprising a computer readable storage device having program code embodied therewith, the program code executable by a processing unit to:
provide a travel companion application to a subscriber for installation on the remote subscriber computer; and
receive travel companion and virtual travel companion recommendations based on customer relationship management data indicating a pre-existing relationship with the travel companion, at a transmission server sent from a data source over the Internet, the transmission server comprising a microprocessor and a memory that stores the remote subscriber's preferences for information format, destination address, specified travel values, and a transmission schedule, and further comprising the microprocessor to:
filter the received travel companion and virtual travel companion recommendations by comparing the received travel companion and virtual travel companion recommendations to the specified travel value;
generate a travel alert from the filtered recommendations, the alert containing a travel companion recommendation identifier, a virtual travel companion identifier, and an address which specifies the location of the data source;
format the travel alert into data blocks; and
transmit the formatted travel alert over a wireless communication channel to a wireless device associated with the subscribers based on the destination address and transmission schedule;
wherein the alert activates a travel companion application to cause the alert to display on the remote subscriber computer and to enable connection via a universal resource locator (URL) to the data source.

7. The computer program product of claim 6, wherein the data source comprises travel data of one or more potential companions maintained within a data structure including a link to the travel data within the data structure.

8. The computer program product of claim 7, further comprising the microprocessor to: determine a match between the remote subscriber and a potential companion; and identify the potential companion to the remote subscriber, wherein the match is for at least a partial duration of scheduled travel.

9. The computer program product of claim 6, wherein each specified travel value has an associated weight, the weight used to prioritize a specified travel value over another specified travel value.

10. The computer program product of claim 6, wherein activation of the travel companion application further comprises program code to switch the travel companion application from an inactive state to an active state in response to detection of a new entry in an operatively coupled calendar application.

11. A method of distributing travel companion recommendations over a network to a remote subscriber computer, the method comprising:
providing a travel companion application to a subscriber for installation on the remote subscriber computer; and
receiving travel companion and virtual travel companion recommendations based on customer relationship management data indicating a pre-existing relationship with the travel companion, at a transmission server sent from a data source over the Internet, the transmission server comprising a microprocessor and a memory that stores the remote subscriber's preferences for information format, destination address, specified travel values, and a transmission schedule, and further comprising the microprocessor to:
filters the received travel companion and virtual travel companion recommendations by comparing the received travel companion and virtual travel companion recommendations to the specified travel value;
generates a travel alert from the filtered recommendations, the alert containing a travel companion recommendation identifier, a virtual travel companion recommendation identifier, and an address which specifies the location of the data source;
formats the travel alert into data blocks; and
transmits the formatted travel alert over a wireless communication channel to a wireless device associated with the subscribers based on the destination address and transmission schedule;
wherein the alert activates a travel companion application to cause the alert to display on the remote subscriber computer and to enable connection via a universal resource locator (URL) to the data source.

12. The method of claim 11 wherein the data source comprises travel data of one or more potential companions maintained within a data structure including a link to the travel data within the data structure.

13. The method of claim 12, further comprising: determining a match between the remote subscriber and a potential companion; and identifying the potential companion to the remote subscriber, wherein the match is for at least a partial duration of scheduled travel.

14. The method of claim 12, wherein the travel data further comprises data selected from the group consisting of: calendar entries and scheduled meetings.

15. The method of claim 11, further comprising utilizing a machine learning model to identify an attendee feature and to apply a classification based on the identified feature.

16. The method of claim 11, further comprising prioritizing a specified travel value through use of a weight.

17. The method of claim 11, wherein activation of the travel companion application further comprises switching the travel companion application from an inactive state to an active state in response to detection of a new entry in an operatively coupled calendar application.

18. The method of claim 11, wherein the received travel companion and virtual travel companion recommendations are placed in a list in an order based on an organization of a corporate entity.

19. The method of claim 11, wherein an entry into a calendar application in communication with the travel companion application activates the travel companion application to identify travel companion and virtual travel companion recommendations.

20. The method of claim 11, wherein the alert is formatted into a hyperlink that is transmitted over the wireless communication channel to the wireless device associated with the subscribers based on the destination address and transmission schedule.

* * * * *